June 7, 1960  R. WESTBURY  2,939,430
ELECTRO-HYDRAULIC ACTUATOR HAVING FEEDBACK JETS
Filed June 30, 1958
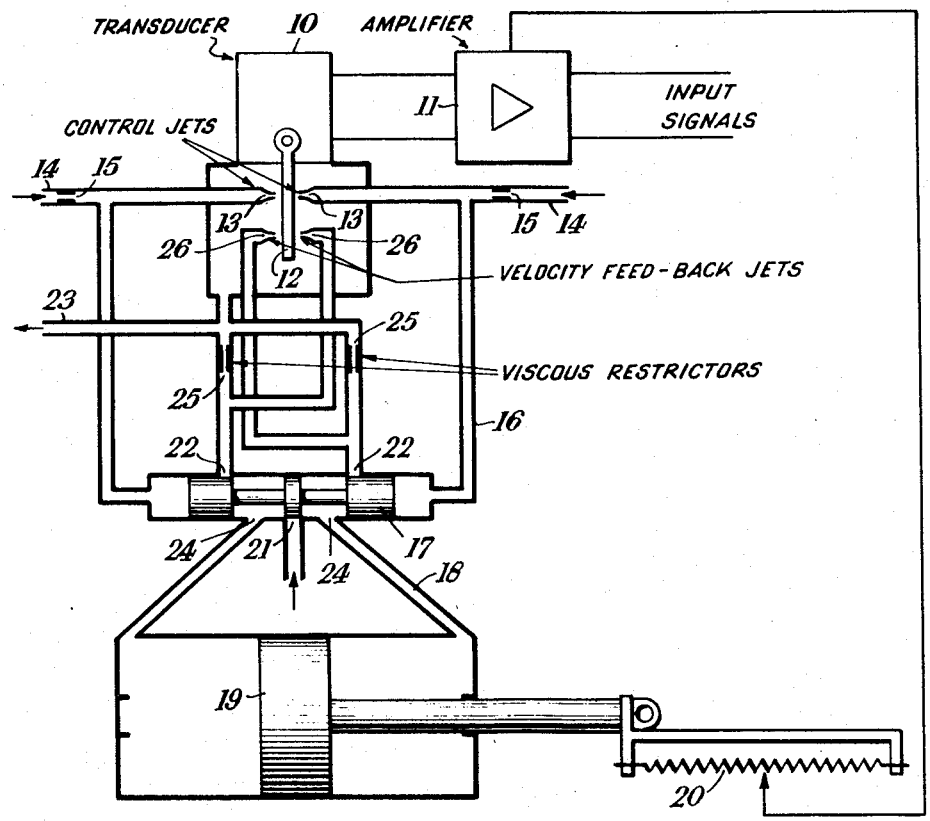

United States Patent Office 2,939,430
Patented June 7, 1960

2,939,430
ELECTRO-HYDRAULIC ACTUATOR HAVING FEEDBACK JETS
Roy Westbury, Bridgnorth, England, assignor to H. M. Hobson Limited, London, England, a company of Great Britain
Filed June 30, 1958, Ser. No. 745,733
2 Claims. (Cl. 121—41)

This invention relates to electro-hydraulic servo mechanisms of the type comprising an electro-mechanical transducer, a first stage servo valve constituted by a "flapper" plate disposed between two jets and actuable under the control of electrical signals applied to the transducer to exercise differential control of the hydraulic pressures in conduits terminating in said jets, a second stage servo valve subject at its opposite ends to the pressures in the two conduits and an output stage controlled hydraulically by the second stage servo valve.

In a servo mechanism of this type it is essential to provide some form of velocity feed-back to the input in order to stabilise the system; otherwise the second stage servo valve will be unable to anticipate the input demand and overshoot will result. Common methods of providing velocity feed-back utilize second stage valve position as an indication of output velocity and make provision for feeding back this position to the input by one of a number of means, e.g. by an electric pick-off measuring valve position or valve centering springs which cause valve position to be related to the pressure difference produced by the first stage "flapper."

In general, these methods result in second stage valve position being proportional to the input error signal and the output response will, therefore, include any non-linearities or discontinuities which exist in the second stage valve response.

With a view to obtaining closer approximation to true output velocity feed-back, the invention provides, in association with the flapper plate of a servo mechanism of the above type, a pair of velocity feed-back jets disposed on opposite sides of the flapper plate, conduits, each embodying a restrictor associated with one of the feed-back jets, providing alternative paths for the return-flow of liquid from the output stage according to the direction of movement of the output member thereof, and means operative during movement of the output member to apply the pressure drop across the restrictor traversed by said return-flow to the associated velocity feed-back jets and thereby exert a force on the flapper plate opposing that exerted thereon by the transducer. Preferably, each velocity feed-back jet constitutes the termination of a conduit communicating with the associated return flow conduit at a point upstream of the restrictor therein.

One embodiment of the invention will now be described in more detail, by way of example, with reference to the accompanying diagrammatic drawing.

Electrical input signals are applied to an electro-mechanical transducer 10 via an amplifier 11. The transducer 10 controls the position of a flapper plate 12 which is disposed between two control jets 13, to which liquid under pressure is supplied through conduits 14, each containing a restrictor 15. Conduits 16 apply the pressures in the conduits 14 upstream of the jets 13 to the opposite ends of a piston type servo valve 17 controlling a hydraulic jack 18. The piston 19 of the jack is associated with a potentiometer 20 for sending position feed-back signals to the amplifier 11.

As will be seen the centre land of the valve 17 controls an inlet port 21 and the end lands of the valve control outlet ports 22 leading to an exhaust line 23 and ports 24 communicating with the ends of the jack cylinder. The exhaust line contains restrictors 25 and further velocity feed-back jets 26 communicate respectively with the two branches of the exhaust line at points upstream of the restrictors 25.

The system operates as follows:

The initial electrical error signal representing a discrepancy between the position of the piston 19, which constitutes the output member of the servo mechanism and an input member, not shown, which applies electrical input signals to the amplifier 11, produces a displacement of the flapper plate 12, e.g. clockwise, to create a pressure differential across the ends of the second stage valve 17, causing it to move to the right thereby causing the jack piston to move to the right. The return oil passes through the right hand return line restrictor 25. The pressure drop due to this flow is applied to the left hand one of the velocity feed-back jets 26 and the latter exert a force on the flapper plate 12 which opposes the initial signal. For a given output velocity this state of affairs will persist until the overall position feed-back from the potentiometer 20 reduces the electrical error signal and the second stage valve 17 will then be brought progressively to its neutral cut-off position. Second stage valve overlap and non-linearities in port area will be relatively unimportant, since the actual return flow from the jack will be proportional to the input error signal and the second stage valve will find its own position.

What I claim as my invention and desire to secure by Letters Patent is:

1. An electro-hydraulic servo mechanism comprising an electro-mechanical transducer adapted to receive electrical input signals, a flapper plate arranged to be rocked by said transducer from a neutral position in correspondence with the electrical signals received thereby, a pair of conduits for discharging jets of liquid under pressure against opposite sides of the flapper plate, a control valve subject at its opposite ends to the hydraulic pressures prevailing in said conduits and movable in opposite directions from a neutral position in response to differences in fluid flow through said conduits, an output stage including an output member movable in opposite directions in accordance with the direction of movement of said control valve under the pressure of fluid supplied thereto from a pressure inlet by said control valve, a pair of return flow conduits also controlled by said control valve for providing alternative paths for return flow of liquid from said output stage in accordance with the direction of movement of the output member, each of said return flow conduits including a restrictor, velocity feed-back jets arranged to impinge on opposite sides of said flapper plate, said feed-back jets being respectively connected to said return flow conduits at points upstream of the restrictors therein so as to be alternatively effective in accordance with the direction of movement of the output member, to apply a force to the flapper plate urging it towards the neutral position.

2. A servo mechanism as claimed in claim 1, comprising an amplifier for applying said electrical input signals to said transducer and a potentiometer associated with said output member and connected to said amplifier to send thereto feed-back signals representative of the position of the output member.

References Cited in the file of this patent
UNITED STATES PATENTS

| | | |
|---|---|---|
| 2,053,797 | King | Sept. 8, 1936 |
| 2,618,288 | Catheron | Nov. 18, 1952 |
| 2,742,916 | Side | Apr. 24, 1956 |
| 2,835,265 | Brandstadter | May 20, 1958 |